Patented June 3, 1952

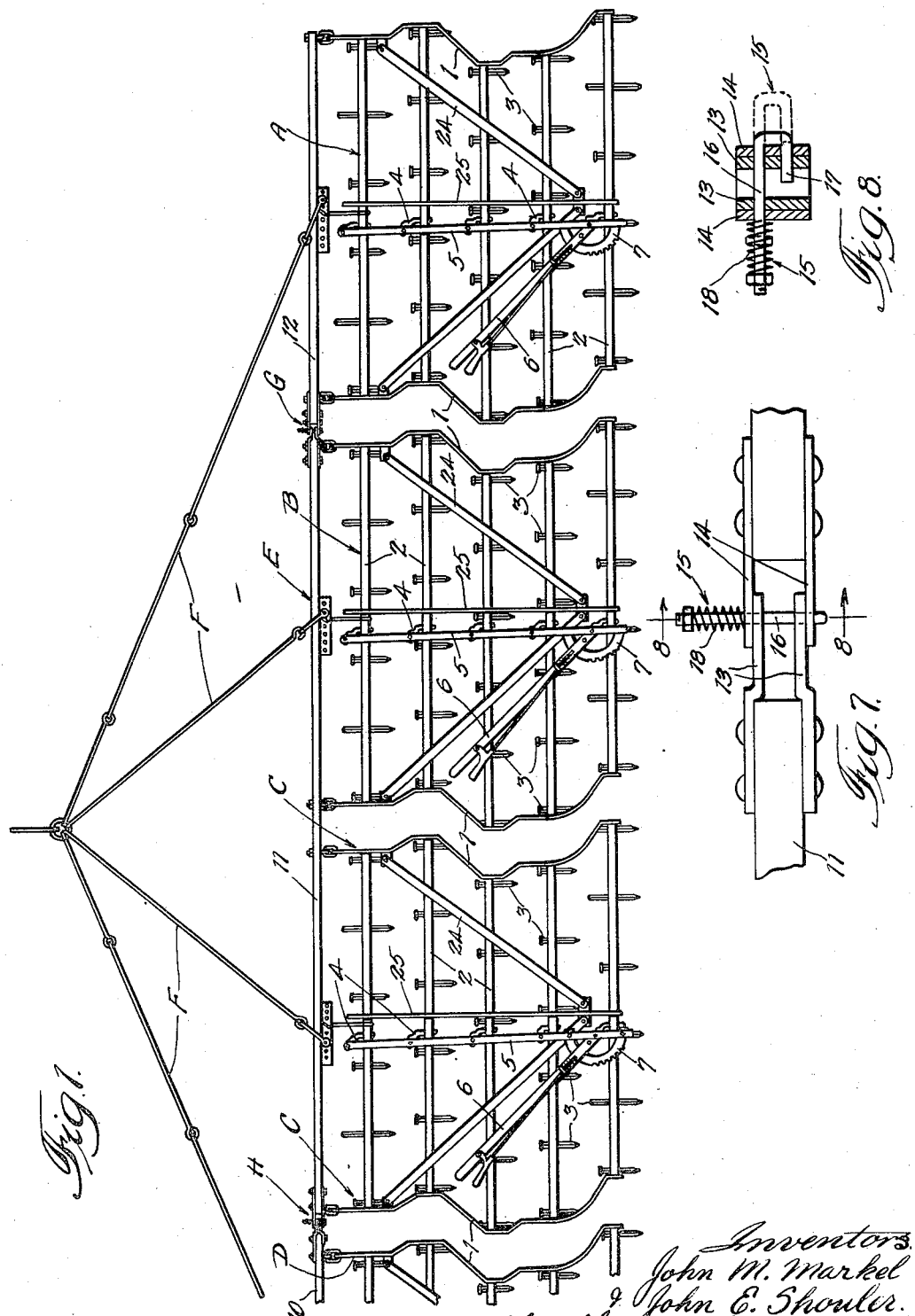

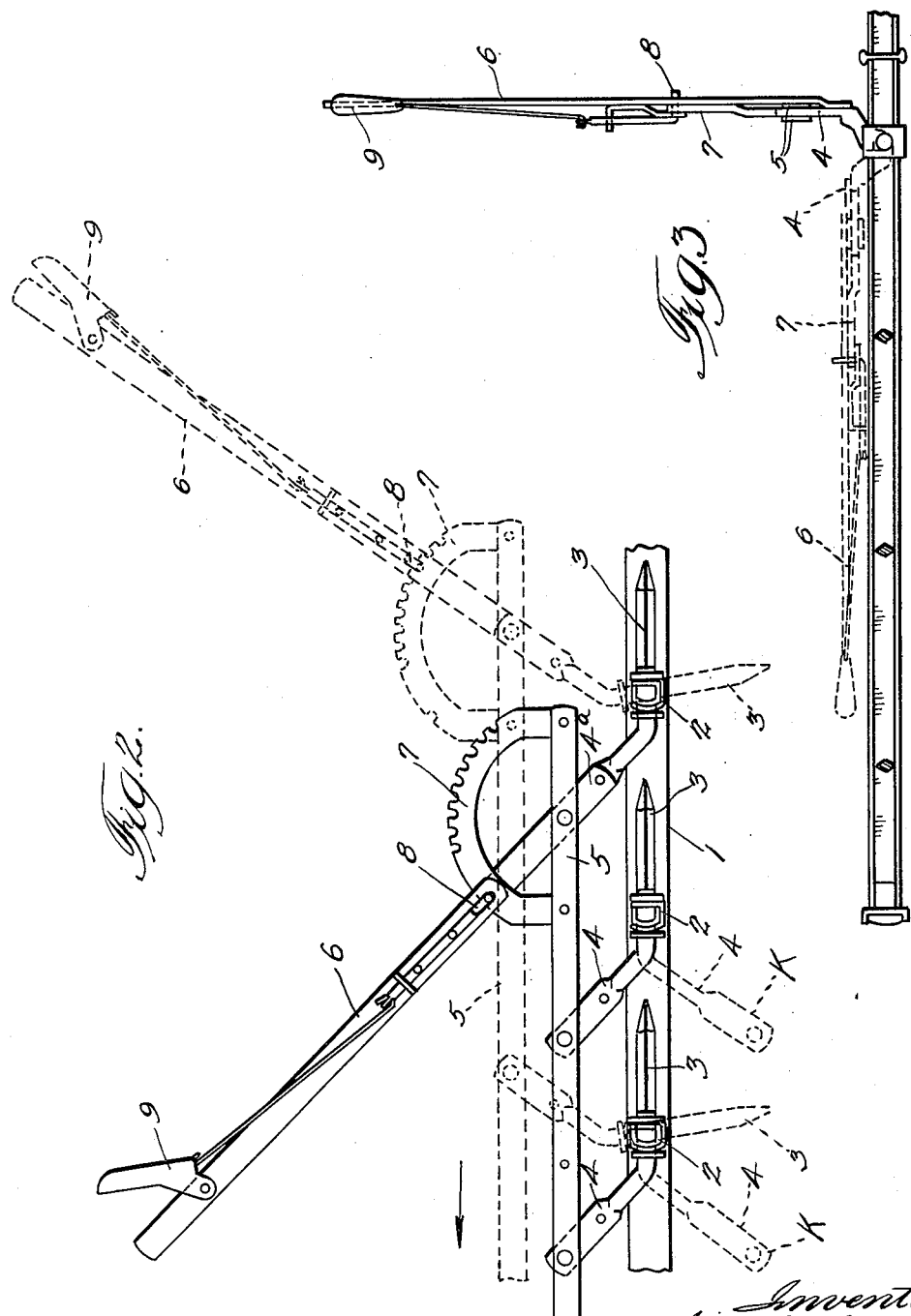

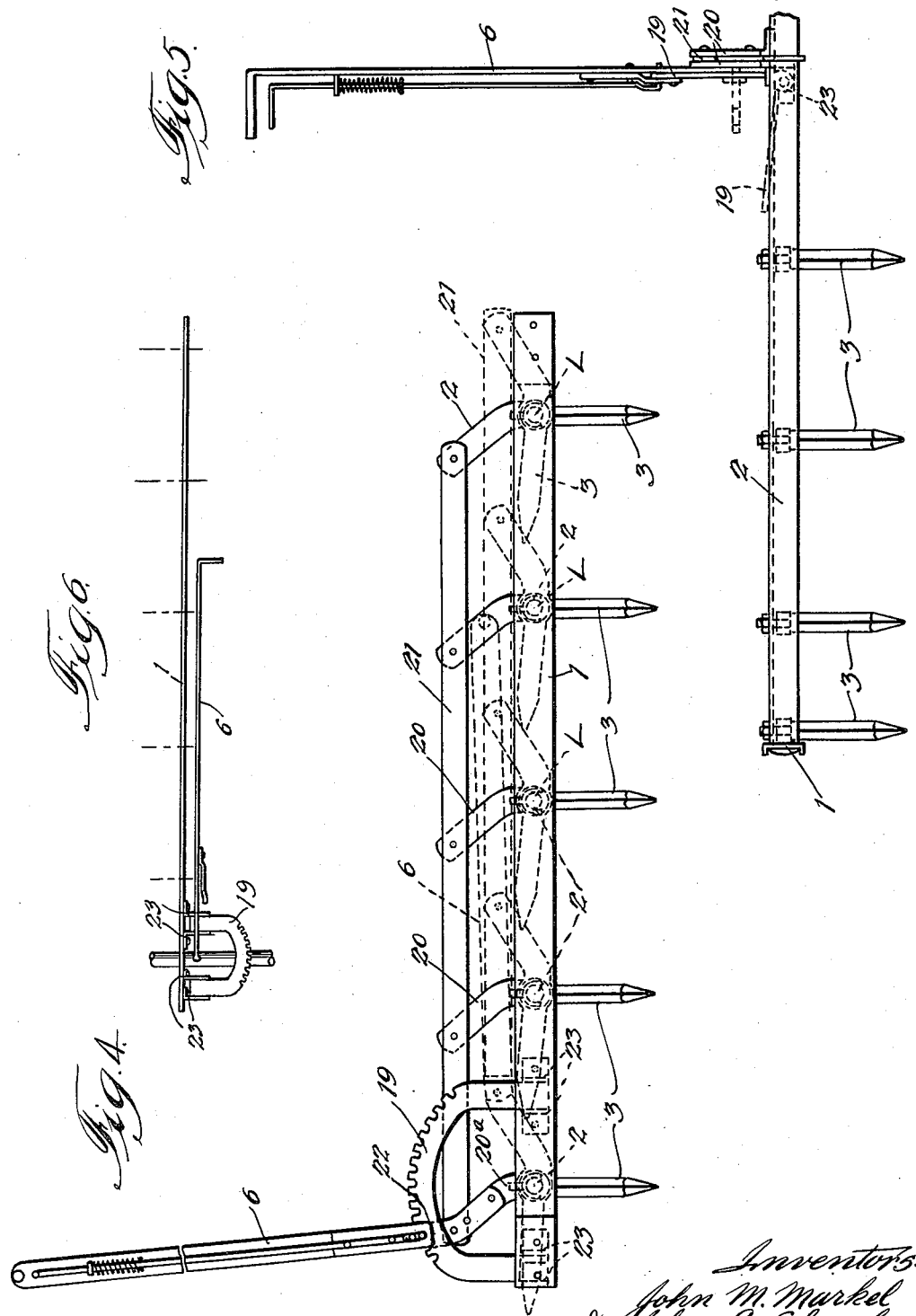

2,599,492

UNITED STATES PATENT OFFICE 2,599,492

SPIKE-TOOTH HARROW

John E. Shouler and John M. Markel, Rockford, Ill., assignors to J. I. Case Company, Racine, Wis., a corporation of Wisconsin Application March 2, 1945, Serial No. 580,736

18 Claims. (Cl. 55—103)

This invention relates to spike tooth harrows.

Spike tooth harrows are made up of grid iron sections. They are drawn over the field in a direction at right angles to the crossbars of the sections. Each crossbar carries a series of spikes or teeth which dig into the ground more or less and break up the clods and form a seed bed. The crossbars are pivoted in the end bars and may be rotated by a lever so as to adjust the angle of contact of the spikes with the ground. A tractor may pull several of these spike tooth harrows and they are often ganged up two or more abreast. This makes a unit which is too wide to travel through an ordinary gate.

It is accordingly desirable to be able to fold one of the harrow sections over on top of its neighbor. The levers, however, interfere. An object of the present invention is to be able to fold the levers down flat on the harrow sections so that neighboring harrow sections can be folded on top of each other. A slight rearrangement of the drawbar or drawchains will then permit the complete outfit to be dragged through an ordinary gate.

These spike tooth harrows are ordinarily adjusted so that the sharp points of the spikes extend downwardly and rearwardly from the generally horizontally extending frame in which the rock bars carrying the spikes are mounted. The harrow is usually drawn over the field in one direction only so that the lower front sides of these teeth become worn smooth and do not dig into the ground as effectively as at first.

A further object of the invention is to provide a spike tooth harrow in which the rock bars carrying the spikes may be adjusted so that the spikes may be made to project from either side of the frame as desired, so that by making this adjustment the harrow frame may be turned over, thereby reversing the position of the spikes so that the unworn rear side will become the front side of the spike.

A further object of the invention is to improve the rigidity of the harrow sections.

Further objects and advantages of the invention will be apparent from the description and claims.

In the drawings, in which two forms of my invention are shown,

Figure 1 is a plan view of a four-section harrow;

Fig. 2 is a side elevational view showing a quadrant and lever construction which can be folded down flat when the harrow sections are to be folded up;

Fig. 3 is a view from the right of Fig. 2 showing the lever and quadrant in operative position and also showing in dotted lines the lever and quadrant in folded position;

Fig. 4 is a side elevational view similar to Fig. 2 but showing a different form of quadrant and lever construction;

Fig. 5 is an elevational view from the right of Fig. 4, showing the lever and quadrant in operative position and also showing in dotted lines the quadrant and lever folded down flat with respect to the frame in position to enable folding of the harrow sections;

Fig. 6 is a plan view of the quadrant and lever in folded position;

Fig. 7 is a fragmentary plan view of a hinge connection; and

Fig. 8 is a section on the line 8—8 of Fig. 7.

Referring to the drawings in detail and first to Figs. 1-3, inclusive, the harrow shown comprises four generally similar sections A, B, C and D secured to a transversely extending foldable drawbar E to which are connected the jointed links F by which the harrow is drawn over the ground. The drawbar E is provided with hinge constructions at G and H which will enable the section A to be folded over on top of the section B and the section D to be folded over on top of the section C. The details of these hinge connections are shown in Figs. 7 and 8 and will be described later. It will be noted that the jointed links F enable the folding movement of the sections.

As previously indicated, the levers which adjust the angle of the spikes with respect to the ground extend in general upwardly from the harrow frame when the harrow is being used, and these levers and the quadrants with which they cooperate would interfere with the folding together of the harrow sections. The harrow sections are in general similar and one only need be described in detail.

Each section comprises a pair of frame ends 1 of irregular shape, a plurality of rock bars 2 rockably mounted in these frame ends 1, a plurality of spikes 3 mounted on these rock bars, a plurality of rock arms 4, one secured to each of said rock bars, and a connecting link 5 to which the ends of said rock arms 4 are pivotally secured. For adjusting the angle of the spikes, one of the rock arms 4a is extended to provide an operating lever 6. This lever cooperates with a quadrant 7 mounted on the connecting link 5. A detent 8 operated by the small lever 9 on the adjusting lever 6 cooperates with the quadrant 7 to hold the spikes in the desired position.

In order to enable the lever 6 and quandrant 7 to be folded down flat against the harrow frame, the rock arms 4 are mounted for swivelling movement in the crossbars as well as for rocking movement therewith, and the rock arms are so designed that they can be swung to the position shown in full lines in Fig. 2, in which the axes about which the rock arms are swivelled lie in alignment (in the same plane with the spikes) so that the entire set of rock arms 4, the connecting link 5, the quadrant 7 carried thereby, and the operating lever 6 may be folded down flat to the dotted-line position shown in Fig. 3, thus enabling the outer harrow sections A and D to be folded over on top of the inner harrow sections B and C. The rock arms and the operating lever are offset with respect to the axis about which they are swivelled, as shown in Fig. 3, thus enabling the quadrant and lever to lie flat above the upper face of the harrow frame when in the dotted-line position shown in Fig. 3.

It will be noted that when the rock arms 4 are shifted to any position other than that in which their axes are in alignment, it will be impossible to fold these arms and the quadrant 7 and lever 6 associated therewith down flat. This construction, therefore, prevents any danger of the lever and quadrant flopping down on top of the harrow frame when the spike teeth are in operative position.

The swivelling of the rock arms 4 in the rock bars 2 has another advantage in addition to enabling the flat folding of the lever and quadrant. By disconnecting the connecting link 5, quadrant 7 and lever 6 from the rock arms 4, turning the rock arms to the lower dotted-line position shown at K in Fig. 2 and again connecting the connecting link 5, quadrant 7, and lever 6 with the rock arms 4, the harrow section can be turned upside down, in which case the substantially unworn rear faces of the harrow spikes 3 will become operative faces.

Each of the hinge connections G and H of the drawbar sections is designed so that when in use the drawbar sections 10, 11 and 12 may be held substantially rigid but so that by simple manipulation the rigid connection may be disconnected and a part of this rigid connection be used as a hinge between the sections.

This construction, as shown in Figs. 7 and 8, comprises a pair of hinge straps 13 connected to one drawbar section 11, a pair of hinge straps 14 connected to the other drawbar section, and a U-shaped hinge and latch pin 15 cooperating with these hinge straps. The longer arm 16 of the U-shaped pin extends through registering openings in the hinge straps 13 and 14 and serves as a hinge member while the shorter arm 17 of the U-shaped pin is engageable with openings in two of the straps which are brought into registration when the drawbar sections are in alignment with each other. A spring 18 is provided surrounding the long arm of the pin and urging the pin toward latching position. If it is desired to unlatch the drawbar in order to fold the harrow sections, the pin 15 is slipped to the right to the dotted-line position shown in Fig. 8 which moves the short arm of the pin out of the registering openings. The U-shaped pin can then be turned so that the arm 17 does not register with the openings, and the outermost harrow section can then be swung up over the adjacent section. The transverse extent of the harrow is thus halved to enable it to be drawn through a narrow gate or the like.

In the construction shown in Figs. 4, 5 and 6, the lever 6 which controls the pitch or angle of the spikes 3 can be folded down about its transversely extending axis L so as to lie substantially flat against the frame of the harrow into a position in which it is clear of the quadrant. The quadrant 19 can then be folded down about a longitudinally extending axis to lie flat against the harrow frame, these positions being shown in dotted lines in Fig. 5. In this form the spikes 3, the rock bars 2, and the frame ends 1 may be substantially like those in Figs. 1, 2 and 3. For rocking the rock bars, each rock bar 2 is provided with a rock arm 20 secured thereto, and a connecting bar 21 to which the upper ends of the rock arms 20 are pivotally secured. An operating lever 6 is secured to one of these rock arms 20a.

Referring to Fig. 4, it will be noted that when the operating lever 6 is folded down flat, the keeper 22 on this lever 6 which normally engages the quadrant 19 to hold the quadrant and lever in alignment is disengaged from the quadrant, thus freeing the quadrant for independent movement. The quadrant is pivotally mounted in brackets 23 secured to the frame for movement about an axis extending longitudinally of the line of travel, so that when the lever is free from the quadrant, the quadrant can be folded down flat as shown in Fig. 6.

The frame ends 1 are somewhat zigzag in plan view, the shape being determined by the offsetting or staggering of the spikes 3 on the rock bars 2. By means of this zagzag formation, the transverse spacing between the adjacent spikes of the adjacent sections may be the same as the transverse spacing of the spikes along the rock bar of a section. Racking of the frame is minimized by braces 24 extending diagonally across the frame, each secured at one end to a frame end 1 and at the other end to a central longitudinally extending member 25 in which the rock bars 2 are swivelled.

Further modifications will be apparent to those skilled in the art and it is desired, therefore, that the invention be limited only by the scope of the appended claims.

Having thus described the invention, what we claim and desire to secure by Letters Patent is:

1. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground comprising a lever which extends upwardly when in position for use, a quadrant mounted on said harrow cooperating with said lever to hold it in adjusted position, and means for mounting said quadrant, said latter means including means to swing said quadrant about a longitudinal axis from its position of use to a position substantially parallel to said frame.

2. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground comprising a lever which extends upwardly when in position for use, means for mounting said lever on said frame to enable it to be moved from its upwardly extending position of use to a position adjacent said frame and substantially parallel to the plane of the frame, a quadrant mounted on said harrow cooperating with said lever to hold it in adjusted position, and means for mounting said quadrant, said latter means including means to swing said quadrant about a longitudinal axis from its position of use to a position substantially parallel to said frame.

3. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground comprising a lever which extends upwardly when in position for use; means for mounting said lever on said frame to swing about a transversely extending axis far enough to enable it to be moved from its upwardly extending position of use to a position adjacent said frame and substantially parallel to the plane of the frame, a quadrant mounted on said harrow cooperating with said lever to hold it in adjusted position, and means for mounting said quadrant, said latter means including means to swing said quadrant about a longitudinal axis from its position of use to a position substantially parallel to said frame.

4. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground comprising a lever which extends upwardly when in position for use, means for mounting said lever on said frame to swing about a longitudinally extending axis far enough to enable it to be moved from its upwardly extending position of use to a position adjacent said frame and substantially parallel to the plane of the frame, a quadrant mounted on said harrow cooperating with said lever to hold it in adjusted position, and means for mounting said quadrant, said latter means including means to swing said quadrant about a longitudinal axis from its position of use to a position substantially parallel to said frame.

5. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground, comprising a lever operatively connected to one of said rock bars and extending upwardly when in position for use, a plurality of rock arms, one mounted on each rock bar, a link pivotally connecting said rock arms, and a quadrant cooperating with said lever for holding the lever in adjusted position, said quadrant, rock arms and connecting link being pivotally mounted to swing about a longitudinal axis to enable them to swing from a position of use to a position adjacent said frame and substantially parallel to the plane of the frame.

6. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground comprising a lever which extends upwardly when in position for use; a plurality of rock arms, one mounted on each rock bar, a link pivotally connecting said rock arms, a quadrant cooperating with said lever for holding the lever in adjusted position, said quadrant, rock arms and connecting link being pivotally mounted to swing about a longitudinal axis to enable them to swing from a position of use to a position adjacent said frame and substantially parallel to the plane of the frame, and means for mounting said lever on one of said rock bars to enable it to be moved from its position of use to a position adjacent said frame and substantially parallel to the plane of the frame.

7. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground comprising a lever which extends upwardly when in position for use, a plurality of rock arms, one mounted on each rock bar, a link pivotally connecting said rock arms, a quadrant cooperating with said lever for holding the lever in adjusted position, said quadrant, rock arms and connecting link being pivotally mounted to swing about a longitudinal axis to enable them to swing from a position of use to a position adjacent said frame and substantially parallel to the plane of the frame, and means for mounting said lever on one of said rock bars to swing about a longitudinal axis to enable it to be moved from its position of use to a position adjacent said frame and substantially parallel to the plane of the frame.

8. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground comprising a lever which extends upwardly when in position for use; a plurality of rock arms, one mounted on each rock bar, a link pivotally connecting said rock arms, a quadrant cooperating with said lever for holding the lever in adjusted position, said quadrant, rock arms and connecting link being pivotally mounted to swing from a position of use to a position adjacent said frame and substantially parallel to the plane of the frame, and said lever being mounted to swing about a transverse axis to enable it to be moved from its position of use to a position adjacent said frame and substantially parallel to the plane of the frame.

9. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground comprising a plurality of rock arms to rock the rock bars, one secured to each rock bar, said rock arms being pivotally mounted on said rock bars to swing about axes transverse to the axes of the rock bars, respectively, a link pivotally connecting said rock bars together, and a lever for operating said link and rock arms.

10. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground comprising a plurality of rock arms, one secured to each rock bar, said rock arms being pivotally mounted on said rock bars to swing about axes transverse to the axes of the rock bars, respectively, a link pivotally connecting said rock bars together, a lever for operating said link and rock arms, and a quadrant mounted on said link, said quadrant and lever being swingable with the rock arms to a position substantially parallel to the frame.

11. A spike tooth harrow comprising a generally horizontal frame, a plurality of longitudinally spaced rock bars mounted on said frame and extending transversely of the line of travel, a plurality of harrow teeth mounted on each rock bar, and means for adjusting said rock bars in unison to vary the angle of contact of the teeth with the ground comprising a plurality of rock arms to rock the rock bars, one secured to each rock bar, said rock arms being pivotally mounted on said rock bars to swing about axes transverse to the axes of the rock arms, respectively, a link pivotally connecting said rock bars together, and a lever for operating said link and rock arms, said teeth extending substantially parallel to the axes of said rock arms.

12. A spike tooth harrow comprising at least two generally horizontal sections, each section comprising a generally horizontal frame, a plurality of longitudinally spaced bars mounted on said frame and extending transversely thereof, a plurality of harrow teeth mounted on each bar, and a drawbar to which said sections are connected, said drawbar having at least two portions to which said sections are connected, respectively, and a hinge connection between said drawbar portions to enable one section to be folded on top of the other section, said hinge connection comprising two overlapping tongue members on said drawbar portions, respectively, having registering hinge pin openings therein and aligning openings brought into registration when the drawbar portions are in alignment, and a U-shaped member, one arm of which forms a hinge pin extending through said hinge pin openings and slidable axially therein and the other arm of which is movable into and out of said aligning openings by the sliding movement of said hinge pin.

13. A spike tooth harrow comprising a generally horizontal frame, a plurality of longitudinally spaced rock bars mounted on said frame and extending transversely of the line of travel, harrow teeth mounted on said rock bars to rock therewith, and means for adjusting the rock bars in unison to vary the angle of contact of the teeth with the ground comprising a plurality of rock arms, one swiveled on each rock bar for movement about an axis transverse to said bar, and a link pivotally connecting said rock arms.

14. A spike tooth harrow comprising a generally horizontal frame, a plurality of longitudinally spaced rock bars mounted on said frame and extending transversely of the line of travel, harrow teeth mounted on said rock bars to rock therewith, and means for adjusting the rock bars in unison to vary the angle of contact of the teeth with the ground comprising a plurality of rock arms, one swiveled on each rock bar for movement about an axis transverse to said bar, and a link pivotally connecting said rock arms, said rock arms being swiveled to move from a position in which the pivotal connections with the links are on one side of the frame to a position in which they are on the other side of the frame.

15. A spike tooth harrow comprising a generally horizontal frame, a plurality of longitudinally spaced rock bars mounted on said frame and extending transversely of the line of travel, harrow teeth mounted on said rock bars to rock therewith, and means for adjusting the rock bars in unison to vary the angle of contact of the teeth with the ground comprising a plurality of rock arms, one swiveled on each rock bar for movement about an axis transverse to said bar, a link pivotally connecting said rock arms, a quadrant secured to said link, and a lever secured to one of said arms and engageable with said quadrant to hold the rock bars in adjusted position.

16. A spike tooth harrow comprising a generally horizontal frame, a plurality of longitudinally spaced rock bars mounted on said frame and extending transversely of the line of travel, harrow teeth mounted on said rock bars to rock therewith, and means for adjusting the rock bars to vary the angle of contact of the teeth with the ground and to move them from a position in which the teeth project from one side of said frame to a position in which they project from the other side of said frame comprising a plurality of rock arms, one swiveled on each rock bar for movement about an axis transverse to said bar, and a disconnectible link pivotally connected to said rock arms.

17. A spike tooth harrow comprising a generally horizontal frame, a plurality of longitudinally spaced rock bars mounted on said frame and extending transversely of the line of travel, harrow teeth mounted on said rock bars to rock therewith, and means for adjusting the rock bars to vary the angle of contact of the teeth with the ground and to move them from a position in which the teeth project from one side of said frame to a position in which they project from the other side of said frame comprising a plurality of rock arms, one swiveled on each rock bar for movement about an axis transverse to said bar, and a disconnectible link pivotally connected to said rock arms, said rock arms being swiveled to move from a position in which the pivotal connections with the link are on one side of the frame to a position in which they are on the other side of the frame.

18. A spike tooth harrow having a pair of foldable interconnected frame sections constructed so as to normally assume an unfolded substantially coplanar relation, each of said frame sections comprising a support, a plurality of longitudinally spaced bars rotatably mounted on said support and extending transversely of the line of travel of said harrow, a plurality of harrow teeth mounted in spaced relation on each of said bars and extending transversely thereof, a plurality of rock arms, one of said arms being swivelly mounted on each of said bars and extending transversely thereof, a link pivotally connected to each of said rock arms, and a lever operatively connected to one of said rock arms and extending upwardly, when in position of use, to effect unitary rotatable movement of said bars; said lever, link, and rock arms being movable to a position substantially parallel to the plane of said frame section, when said frame sections are in a folded superposed relation with respect to one another.

JOHN E. SHOULER.
JOHN M. MARKEL.

REFERENCES CITED

The following references are of record in the file of this patent:

UNITED STATES PATENTS

| Number | Name | Date |
| --- | --- | --- |
| 693,882 | Morrison | Feb. 25, 1902 |
| 940,160 | Johnson | Nov. 16, 1909 |
| 1,089,927 | Keith | Mar. 10, 1914 |
| 1,161,786 | Nelson | Nov. 23, 1915 |
| 1,629,529 | Reimer | May 24, 1927 |
| 2,005,044 | Muntzel | June 18, 1935 |
| 2,129,827 | Donovan | Sept. 13, 1938 |
| 2,144,580 | Sheldon | Jan. 17, 1939 |